United States Patent [19]

Schoening

[11] Patent Number: 4,675,155
[45] Date of Patent: Jun. 23, 1987

[54] ROOF REFLECTOR FOR A HIGH TEMPERATURE SMALL REACTOR

[75] Inventor: Josef Schoening, Hambruecken, Fed. Rep. of Germany

[73] Assignee: Hochtemperatur-Reaktorbau GmbH, Fed. Rep. of Germany

[21] Appl. No.: 823,142

[22] Filed: Jan. 29, 1986

Related U.S. Application Data

[63] Continuation of Ser. No. 553,034, Nov. 18, 1983, abandoned.

[30] Foreign Application Priority Data

Dec. 6, 1982 [DE] Fed. Rep. of Germany ....... 3245022

[51] Int. Cl.$^4$ ............................................. G21C 11/06
[52] U.S. Cl. ..................................... 376/458; 376/381
[58] Field of Search ............... 376/287, 363, 381, 382, 376/383, 458, 459

[56] References Cited

U.S. PATENT DOCUMENTS

| | | | |
|---|---|---|---|
| 4,076,585 | 2/1978 | Cachera | 376/287 |
| 4,290,852 | 9/1981 | Fritz et al. | 376/459 |
| 4,300,984 | 11/1981 | Katscher et al. | 376/459 |

FOREIGN PATENT DOCUMENTS 1564186 1/1970 Fed. Rep. of Germany.

Primary Examiner—Deborah L. Kyle
Assistant Examiner—Richard L. Klein
Attorney, Agent, or Firm—Robert J. Koch

[57] ABSTRACT

A graphite roof reflector for a small, high temperature reactor is arranged under the hot gas collector space and is therefore exposed to high thermal and radiation loads. In order to make possible the satisfactory support over the entire operating life of the reactor, the roof reflector is assembled from a center part and an annular part, which are supported in a different manner. The annular part is supported on the side reflector of the reactor. The center part is suspended by means of tie rods from a cover located over the hot gas collector space. The tie rods are placed into bores of the cover through which cold gas flows.

5 Claims, 2 Drawing Figures

4,675,155

ROOF REFLECTOR FOR A HIGH TEMPERATURE SMALL REACTOR

This application is a continuation of application Ser. No. 553,034 filed Nov. 18, 1983, now abandoned.

BACKGROUND OF THE INVENTION

Field of the Invention

The invention concerns a roof reflector for a small high temperature reactor having a reactor core, a cold gas collector space, and a hot gas collector space. The reactor arrangement also includes a cover for the reactor core separating the core from the cold gas collector space, and a side reflector surrounding the reactor core. The roof reflector consists of an outer and an inner ring arranged over the cover and top parts of the side reflector.

BACKGROUND OF THE INVENTION

In small sized high temperature nuclear reactors of this type, the layout of the roof reflector is the cause of design problems due to the exposure of the reflector to high temperatures and to radiation. A freely projecting roof is not possible because of the great span width. A suspension of the roof reflector, for example by means of metal fastening elements, is not feasible because of the fact that such fastening elements would have to be replaced under certain conditions several times during the 40-year operating life of the nuclear power station which would be highly disadvantageous.

SUMMARY OF THE INVENTION

It is an object of the invention to provide with simple means a roof reflector of the aforementioned type with a satisfactory support without the need to replace the fastening elements.

This object is achieved according to the invention by a roof reflector comprising a center part and an annular part surrounding the center part. The annular part is supported on the outer ring of the side reflector and the center part is suspended from the reactor core cover by means of fastening elements. The fastening elements are cooled over their entire length with cold gas from the center part of the cover.

In a preferred embodiment, a plurality of tie rods are provided for the fastening of the center part of the roof reflector. The tie rods are arranged in bore holes present in the center part of the reactor cover. The bores are in communication both with the cold gas collector space and the hot gas collector space. As the result of the higher pressure of the cold gas with respect to the hot gas, the tie rods are constantly exposed to a flow of cold gas. The bores are dimensioned so that in the case of a minimum flow of cold gas to the hot gas collector space and adequate cooling of the tie rods, overall efficiency is affected only negligibly.

The divided configuration and the means to fasten the roof reflector eliminate the aforementioned layout problems and render the secure mounting of the roof reflector possible without the requirement of replacing fastening elements over the entire operating life of the reactor.

BRIEF DESCRIPTION OF THE DRAWING

An example of an embodiment of the invention is described hereinbelow with reference to the drawing attached hereto.

In the drawing.

DETAILED DESCRIPTION OF EMBODIMENTS

Figure 1:
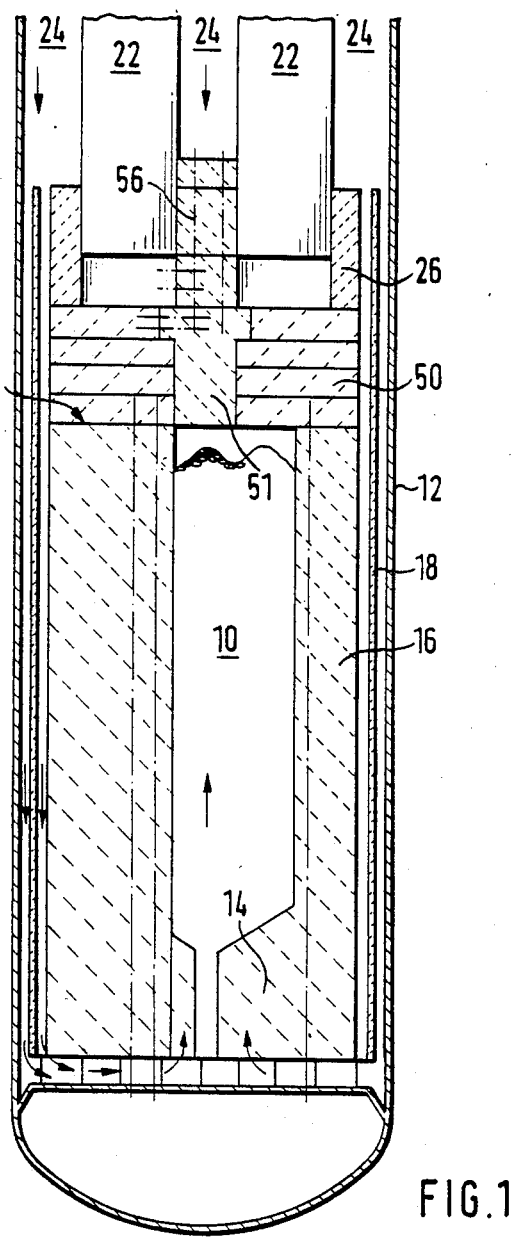
FIG. 1 shows the lower and intermediate area of a nuclear power station with a small, high temperature reactor.

As shown in FIG. 1, the reactor core 10 is located in the lower area of the nuclear power station. The core is enclosed by the reactor pressure vessel and surrounded by a floor reflector 14, a side reflector 16 consisting of two rings together with the thermal side shield 18 rigidly connected with it, and a roof reflector 50. In the upper area over the reactor core 10, several steam generators 22 are arranged. The steam generators are exposed to hot gas from below. Blowers, which are not shown in the drawings, are installed above the steam generators 22. A cold gas collector space 24 is located between the steam generators 22 surrounding them.

Above the roof reflector 50 a graphite cover 26 partially defining a hot gas collector space 28 is arranged. The graphite cover 26 separates the hot gas collector space 28 from the cold gas collector space 24. The cover 26 is fixedly connected in the radial direction with the thermal side shield 18.

Figure 2:
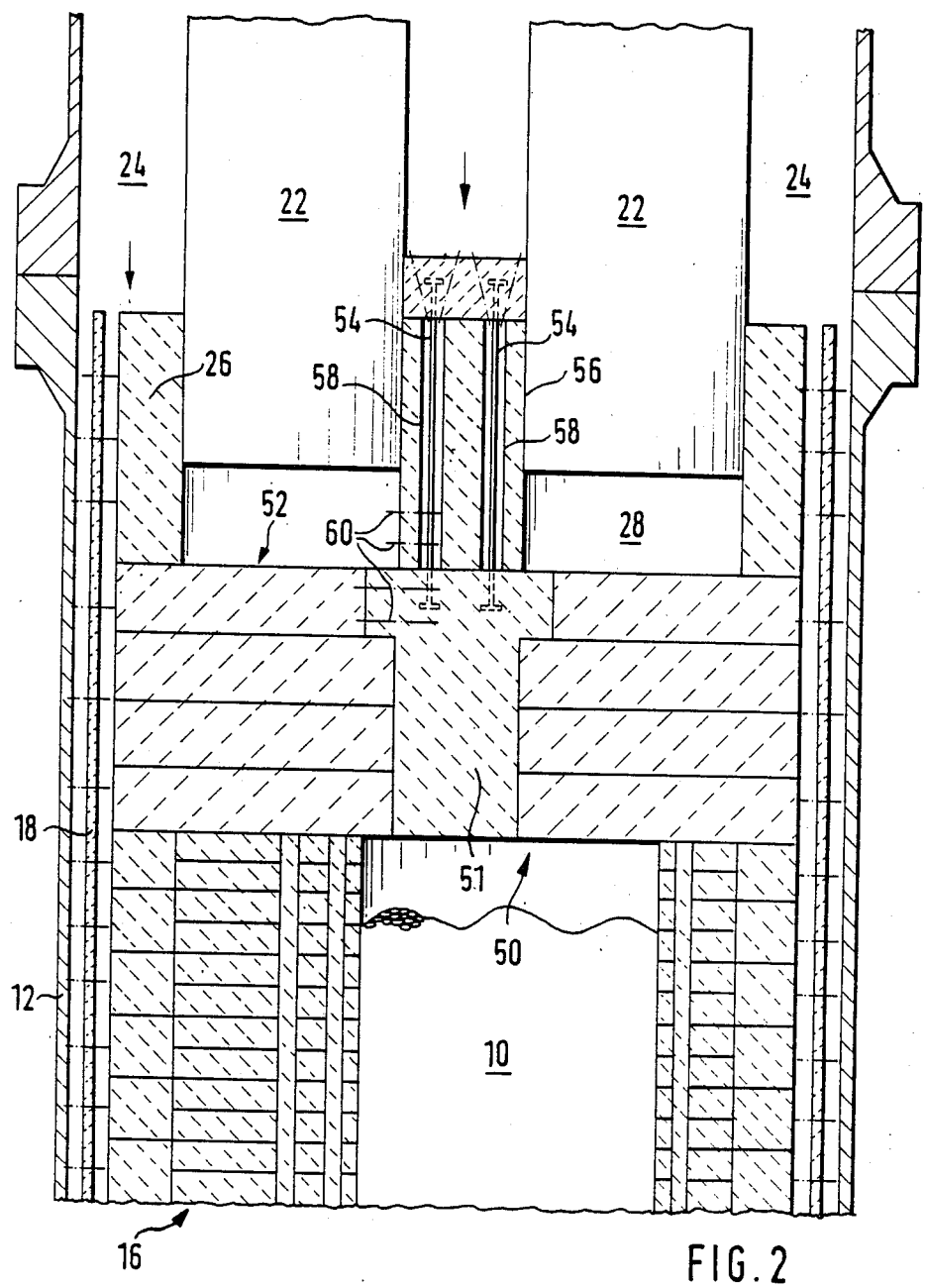
FIG. 2 shows the intermediate area of the nuclear power station with the roof reflector in an enlarged sectional view.

The roof reflector, designated in its entirety by 50, consists of a center part 51 and a multilayer annular part 52 arranged concentrically around the center part 51 (FIG. 2). The annular part 52 is supported on the outer ring of the side reflector 16 and is fastened radially to the thermal side shield 18. The center part 51, on the other hand, is suspended by means of tie rods 54 from the center part 56 of the graphite cover 26, wherein the tie rods 54 are arranged in longitudinal bores 58 of the cover 26, through which cold gas is flowing. The longitudinal bores 58 are connected with the hot gas collector space 60 by means of transverse bores 60.

Due to the pressure of the cold gas being higher than that of the hot gas, cold gas flows around the tie rods 54 and they are cooled adequately. The cold bores 58 are dimensioned so that with a minimum flow of cold gas and with sufficient cooling the overall efficiency of the reactor is affected only negligibly.

The above description describes a preferred embodiment of the invention. It is to be understood however, that the invention is not limited to any single embodiemnt or feature, but should be construed to cover all modifications and alternative embodiments falling within the scope of the invention as defined by the claims which follow.

What is claimed is:

1. A small gas cooled high temperature reactor having a reactor core, cooling gas, a cold gas collector space and a hot gas collector space above said reactor core, a cover separating said cold gas collector space from said hot gas collector space, a side reflector surrounding said reactor core and formed of an outer ring and an inner ring, a roof reflector between said reactor core and said hot and cold gas collector spaces, said roof reflector further comprising:

an annular part supported on the outer ring of the side reflector, a center part surrounded by said annular part, means for suspending said center part from said cover, and means for diverting said cooling gas for cooling said means for suspending comprising cooling gas conduits, wherein said annular part and said center part are graphite.

2. A small high temperature reactor as in claim 1, wherein said cooling gas conduits comprise bores provided in the center of a cover connected with both the cold gas collector space and the hot gas collector space and said means for suspending comprises tie rods arranged in said bores.

3. A small high temperature reactor as in claim 2, wherein the bores are dimensioned to restrict flow of cooling gas from said cold gas collector space to said hot gas collector space to only sufficiently cool said tie rods.

4. A small high temperature reactor having a reactor core, a cold gas collector space and a hot gas collector space above said reactor core, a cover separating said cold gas collector space from said hot gas collector space, a side reflector surrounding said reactor core and formed of an outer ring and an inner ring, a roof reflector between said reactor core and said hot and cold gas collector spaces, said roof reflector further comprising:

an annular part supported on the outer ring of the side reflector, a center part surrounded by said annular part, means for suspending said center part from said cover, means for cooling said means for suspending comprising cooling gas conduits, wherein said annular part and said center part are graphite, and wherein said cooling gas conduits comprise bores provided in a center part of the cover connected with both the cold gas collector space and the hot gas collector space and said means for suspending comprises tie rods arranged in said bores.

5. A small high temperature reactor as in claim 4, wherein the bores are dimensioned to restrict flow of cooling gas from said cold gas collector space to said hot gas collector space to sufficiently cool said tie rods.

* * * * *